United States Patent
Yang et al.

(10) Patent No.: US 9,426,862 B2
(45) Date of Patent: Aug. 23, 2016

(54) LED BACKLIGHT DRIVE CIRCUIT, LIQUID CRYSTAL DISPLAY DEVICE AND DRIVING METHOD

(75) Inventors: Xiang Yang, Shenzhen (CN); Xinming Gao, Shenzhen (CN); Fei Li, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 1110 days.

(21) Appl. No.: 13/512,745

(22) PCT Filed: Apr. 25, 2012

(86) PCT No.: PCT/CN2012/074674
§ 371 (c)(1),
(2), (4) Date: May 30, 2012

(87) PCT Pub. No.: WO2013/152530
PCT Pub. Date: Oct. 17, 2013

(65) Prior Publication Data
US 2013/0271701 A1  Oct. 17, 2013

(30) Foreign Application Priority Data
Apr. 12, 2012  (CN) .......................... 2012 1 0106668

(51) Int. Cl.
*H05B 33/08*   (2006.01)
*G09G 3/34*    (2006.01)

(52) U.S. Cl.
CPC ............ *H05B 33/089* (2013.01); *G09G 3/3406* (2013.01); *G09G 2320/064* (2013.01)

(58) Field of Classification Search
None
See application file for complete search history.

(56) References Cited

U.S. PATENT DOCUMENTS

| 5,537,006 A | * | 7/1996 | Wilson | H05B 39/044 |
| | | | | 315/127 |
| 8,094,688 B2 | * | 1/2012 | Kishigami | H04L 1/24 |
| | | | | 370/245 |

(Continued)

FOREIGN PATENT DOCUMENTS

| CN | 101820710 A | 9/2010 |
| CN | 101916550 A | 12/2010 |

(Continued)

*Primary Examiner* — Crystal L Hammond
(74) *Attorney, Agent, or Firm* — IPro, PLLC; Na Xu

(57) ABSTRACT

The invention discloses an LED backlight drive circuit, an LCD device and a driving method. The LED backlight drive circuit includes a power source; an output capacitor and an LED lightbar which is connected in series with a first controllable switch are in parallel connection, and then are arranged between the output terminal and the ground terminal of the power source. The LED backlight drive circuit further includes a first comparator; a cathode of the first comparator is connected to a first reference voltage, an anode of the first comparator is coupled with the output terminal of the power source, and the output terminal of the first comparator is coupled with a control end of the first controllable switch; when the anode voltage of the first comparator exceeds the cathode voltage, the output terminal of the first comparator drives the first controllable switch to be conducted. In the invention, the LED lightbar only can be conducted at the predetermined voltage. Thus, the LED will be unable to be lighted even if the electric quantity is stored in the output capacitor; only when the output voltage achieves the predetermined voltage in the complete ON operation, the first controllable switch is able to be conducted, which solves the problem of LED blinking in the ON operation.

10 Claims, 2 Drawing Sheets

(56) References Cited

U.S. PATENT DOCUMENTS

| | | | | |
|---|---|---|---|---|
| 8,278,830 B2* | 10/2012 | Archibald | .......... | H05B 33/0827 315/209 R |
| 8,456,108 B2* | 6/2013 | Kimura | .............. | H05B 33/0848 315/250 |
| 8,643,289 B2* | 2/2014 | Ryu | .................. | H05B 33/0815 315/122 |
| 9,265,104 B2* | 2/2016 | Szczeszynski | ........... | H03K 7/08 |
| 9,271,361 B2* | 2/2016 | Zhang | ................ | H05B 33/0845 |
| 2003/0025465 A1* | 2/2003 | Swanson | ............ | H05B 33/0815 315/291 |
| 2005/0110469 A1* | 5/2005 | Inaba | ................... | H02M 3/156 323/222 |
| 2006/0082332 A1* | 4/2006 | Ito | ...................... | H05B 33/0815 315/291 |
| 2007/0001625 A1* | 1/2007 | Kim | .................. | H05B 33/0815 315/312 |
| 2007/0262764 A1* | 11/2007 | Warita | .................... | H02M 3/00 323/284 |
| 2008/0150436 A1* | 6/2008 | Suzuki | ................. | H02M 3/156 315/169.3 |
| 2008/0258636 A1* | 10/2008 | Shih | ................... | H05B 33/0827 315/185 R |
| 2009/0066264 A1* | 3/2009 | Huang | ............... | H05B 33/0818 315/294 |
| 2011/0254468 A1* | 10/2011 | Chen | .................. | H05B 33/0818 315/307 |
| 2011/0285301 A1* | 11/2011 | Kuang | ............... | H05B 33/0845 315/200 R |
| 2012/0001557 A1* | 1/2012 | Hagino | ................. | G09G 3/342 315/192 |
| 2012/0056543 A1* | 3/2012 | Yang | .................... | H05B 33/089 315/120 |
| 2012/0075544 A1* | 3/2012 | Sasaki | ............... | G02F 1/133603 349/42 |
| 2012/0229045 A1* | 9/2012 | Kikuchi | ............. | H05B 33/0818 315/224 |
| 2012/0248998 A1* | 10/2012 | Yoshinaga | ......... | H05B 33/0815 315/193 |
| 2012/0262148 A1* | 10/2012 | Tu | .................... | G01R 19/16552 324/76.11 |
| 2013/0147362 A1* | 6/2013 | Lee | ........................ | H05B 37/02 315/122 |
| 2013/0249406 A1* | 9/2013 | Kim | ................... | H05B 33/0887 315/122 |
| 2013/0271701 A1* | 10/2013 | Yang | .................... | H05B 33/089 349/69 |
| 2013/0285571 A1* | 10/2013 | Li | ...................... | H05B 33/0827 315/297 |
| 2013/0293136 A1* | 11/2013 | Yang | .................. | H05B 33/0851 315/224 |
| 2014/0320031 A1* | 10/2014 | Wu | .................... | H05B 33/0812 315/193 |
| 2014/0340615 A1* | 11/2014 | Kikuchi | ............. | H05B 33/0815 349/61 |

FOREIGN PATENT DOCUMENTS

| | | |
|---|---|---|
| CN | 102026440 A | 4/2011 |
| CN | 102201202 A | 9/2011 |
| CN | 102402953 A | 4/2012 |
| JP | 2010-152157 A | 7/2010 |

* cited by examiner

--Prior Art--

LED BACKLIGHT DRIVE CIRCUIT, LIQUID CRYSTAL DISPLAY DEVICE AND DRIVING METHOD

TECHNICAL FIELD

The invention relates to the field of liquid crystal displays (LCDs), and more particularly to a light emitting diode (LED) backlight driver circuit, an LCD device, and a driving method.

BACKGROUND

An LED is generally used as a backlight source in conventional LCD devices. A conventional LED drive circuit is shown in FIG. 1. When an ON/OFF signal performs the ON operation and OFF operation at a short interval time, the electrical charges of an output capacitor C1 are not discharged in time when performing OFF operation immediately after the ON operation, so that the charges will be filled into the LED in the next ON operation, and then filled into the normal LED driver. Because the LED drive circuit always has a certain delay time in the ON operation of each time, the LED lights will be enlightened twice, causing blinking.

Besides, when the voltage has a slower rise time, the LED is conducted by low current without reaching the normal voltage. At this moment, the LED will rise slowly, and the eyes will feel the blinking of LED.

To solve the aforementioned problems, there are usually two methods as follows:

1. Accelerating the ON speed so that the eyes cannot judge whether the LED lights are enlightened twice. But accelerating the ON speed will affect the stability of a system loop circuit and the problem of the capacitor electrical charges is not directly solved.

2. Directly adding a discharge resistor at a capacitor end to discharge the capacitor. But directly adding the discharge resistor is equivalent to adding a load, so the circuit power will be consumed all the time and unnecessary consumption will be caused; and once the resistor is damaged, an output end will have a short circuit so that the problem of unsafety will occur.

SUMMARY

The aim of the invention is to provide an LED backlight drive circuit, an LCD device and a driving method.

The aim of the invention is achieved by the following technical schemes:

An LED backlight drive circuit comprises a power source; an output capacitor and an LED lightbar which is connected in series with a first controllable switch are in parallel connection, and then are arranged between an output terminal and a ground terminal of the power source. The LED backlight drive circuit further comprises a first comparator; a cathode of the first comparator is connected to a first reference voltage, an anode of the first comparator is coupled with the output terminal of the power source, and the output terminal of the first comparator is coupled with the control end of the first controllable switch. When the anode voltage of the first comparator exceeds the cathode voltage, the output terminal of the first comparator drives the first controllable switch to be conducted.

Preferably, a first resistor and a second resistor are connected in series between the output terminal and the ground terminal of the power source; the anode of the first comparator is connected between the first resistor and the second resistor. This is a technical scheme of dividing voltage by the resistors. Because the voltage at the output terminal of the power source is higher, if the first comparator directly collects voltage, the higher withstand voltage capability is required by the devices, which increases the difficulty of selecting devices and the cost. After the voltage is divided by the resistors, the voltage collected from the power source end is decreased in equal proportion, and thus the requirement for the withstand voltage capability is reduced.

Preferably, a second controllable switch controlled by an ON signal is arranged between the first resistor and the second resistor. Thus, a second comparator only runs in the ON operation to avoid malfunctioning under other circumstances and improve the controlling reliability.

Preferably, the LED backlight drive circuit further comprises a second comparator; an anode of the second comparator is connected to a second reference voltage, and a cathode of the second comparator is coupled with an output terminal of the power source; the output terminal of the second comparator is coupled with the control end of the first controllable switch; and the second reference voltage is higher than the first reference voltage. When the cathode voltage of the first comparator exceeds the anode voltage, the output terminal of the first comparator drives the first controllable switch to be blocked. This is an overvoltage protection circuit. When the power source end has the excessive output voltage and its anode voltage drop in the second comparator is higher than the second reference voltage, the second comparator outputs the low level to forcibly switch off the first controllable switch and protect the LED from being broken down by a high voltage.

Preferably, the first resistor and a third resistor are connected in series between the output terminal and the ground terminal of the power source; the anode of the second comparator is connected between the first resistor and the third resistor; and a third controllable switch controlled by an ON signal is arranged between the first resistor and the third resistor. This is a technical scheme of dividing voltage by the resistors. Because the voltage at the output terminal of the power source is high, if the first comparator directly collects voltage, the high withstand voltage capability is required by the devices, which increases the difficulty of selecting devices and the cost. After the voltage is divided by the resistors, the voltage collected from the power source end is decreased in equal proportion, and thus the requirement for the withstand voltage capability is reduced. Thus, adding the third controllable switch can ensure that the second comparator only runs in the ON operation to avoid malfunctioning under other circumstances and improve the controlling reliability.

Preferably, the control end of the first controllable switch is further connected with a dimming control module, the dimming control module is provided with an overvoltage protection collection point, the first resistor and a fourth resistor are connected in series between the output terminal and the ground terminal of the power source, and the overvoltage protection collection point is connected between the first resistor and the fourth resistor. This is one specific embodiment of the overvoltage protection. Thus, when the output terminal of the power source has excessive voltage, the first controllable switch can be switched off to protect the LED.

Preferably, the LED backlight drive circuit further comprises the second comparator. The first resistor, the second resistor, the third resistor and the fourth resistor are arranged between the output terminal and the ground terminal of the power source; the second resistor, the third resistor and the fourth resistor are arranged in parallel connection, and are in series connection with the first resistor. The second controllable switch controlled by an ON signal is arranged between the first resistor and the second resistor, and a third controllable switch controlled by an ON signal is arranged between the first resistor and the third resistor. The anode of the first comparator is connected between the first resistor and the second resistor; the cathode of the second comparator is connected to the second reference voltage, the anode of the second comparator is connected between the first resistor and the third resistor, and the output terminal of the second comparator is coupled with the control end of the first controllable switch. The second reference voltage is higher than the first reference voltage. The control end of the first controllable switch is further connected with a dimming control module, the dimming control module is provided with the overvoltage protection collection point, and the overvoltage protection collection point is connected between the first resistor and the fourth resistor. This is an LED backlight drive circuit with dual protections of under-voltage protection and overvoltage protection.

An LCD device comprises an LED backlight drive circuit mentioned above.

A driving method of the LED backlight drive circuit mentioned above comprises the following steps:

A: Setting the first reference voltage, and collecting the input voltage at the power source end of the LED backlight drive circuit as the comparison voltage. If the comparison voltage is lower than the first reference voltage, carry out step B; if the comparison voltage is higher than the first reference voltage, carry out step C;

B: Driving the first controllable switch to be blocked, and returning to step A;

C: Driving the first controllable switch to be conducted, and returning to step A.

Preferably, the step A further comprises: setting the second reference voltage which is higher than the first reference voltage. If the comparison voltage is lower than the second reference voltage, carry out step D; if the comparison voltage is higher than the second reference voltage, carry out step E.

D: Keeping the first controllable switch in the conducting state, and returning to step A;

E: Driving the first controllable switch to be blocked, and returning to step A;

When the power source end has the excessive output voltage and its comparison voltage is higher than the second reference voltage, the second comparator outputs the low level to forcibly switch off the first controllable switch and protect the LED from being broken down by a high voltage.

The invention uses the first comparator to control the conducting and the blocking of the LED lightbar. When the voltage drop of the output voltage of the power source, at the anode of the first comparator, is lower than the first reference voltage, the first comparator outputs the low level, and the first controllable switch is blocked; only when the voltage drop of the output voltage of the power source, at the anode of the first comparator, exceeds the first reference voltage, the first comparator outputs the high level, and the first controllable switch is conducted to ensure that the LED can be conducted at the predetermined voltage for providing the normal brightness. Otherwise, when the LED is conducted at the low voltage, the eyes can feel that the LED is dimming up, causing the displaying quality to be reduced. In the invention, the LED lightbar only can be conducted at the predetermined voltage. Thus, the LED will be unable to be lighted even if the electric quantity is stored in the output capacitor; only when the output voltage achieves the predetermined voltage in the complete ON operation, the first controllable switch is able to be conducted, which solves the problem of blinking of the LED in the ON operation.

DETAILED DESCRIPTION

The invention will further be described in detail in accordance with the figures and the preferable examples.

Figure 1:
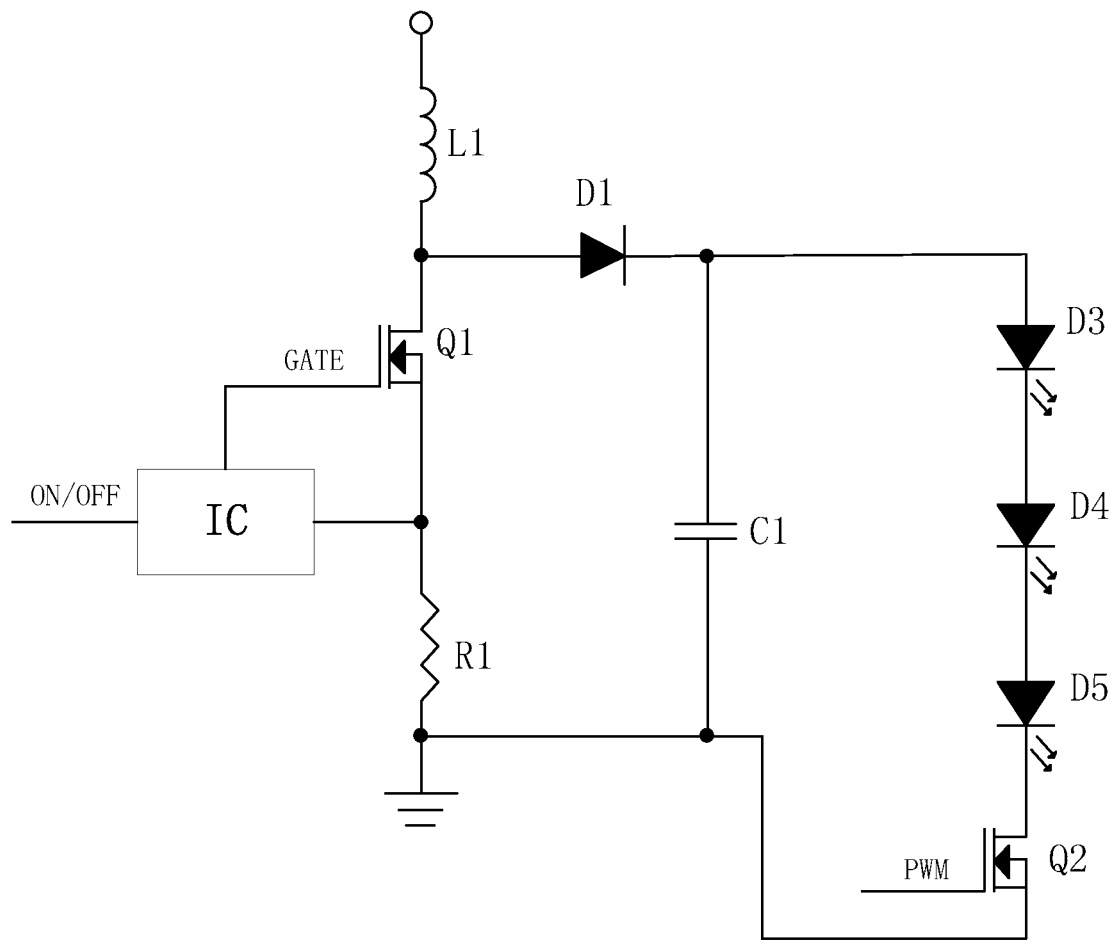
FIG. 1 is a schematic diagram of a conventional backlight drive circuit.
Figure 2:
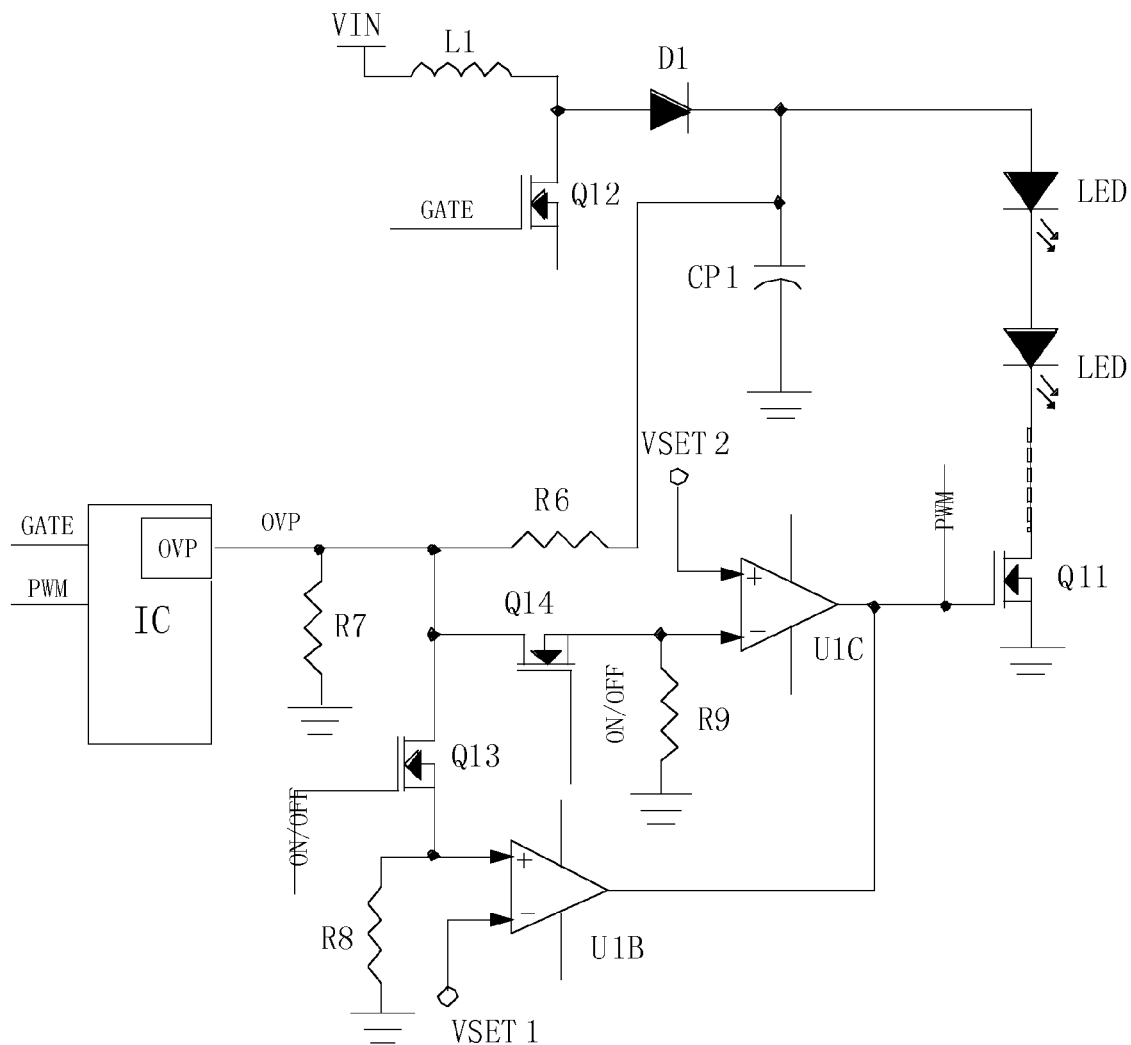
FIG. 2 is a schematic diagram of a backlight drive circuit of an example of the invention.

As shown in FIG. 2, an LCD device comprises an LCD panel and a backlight module providing a light source to the LCD panel. The backlight module comprises an LED backlight drive circuit, and the backlight drive circuit comprises a power source; an output capacitor CP1 and an LED lightbar which is connected in series with a first controllable switch Q11 are in parallel connection, and then are arranged between the output terminal and the ground terminal of the power source. The LED backlight drive circuit further comprises a first comparator U1B. A cathode of the first comparator U1B is connected to a first reference voltage VSET1, and an anode of the first comparator U1B is coupled with the output terminal of the power source, for collecting the output voltage of the power source as a comparison voltage; the output terminal of the first comparator U1B is coupled with a control end of the first controllable switch Q11. When the anode voltage of the first comparator exceeds the cathode voltage, the output terminal of the first comparator drives the first controllable switch to be conducted.

Furthermore, the first comparator U1B can collect the voltage of the power source in the manner of dividing voltage by the resistors, namely, a first resistor R6 and a second resistor R8 are connected in series between the output terminal and the ground terminal of the power source; and the anode of the first comparator U1B is connected between the first resistor R6 and the second resistor R8. After the voltage is divided by the resistors, the voltage collected from the power source end is decreased in equal proportion, and thus the requirement for the withstand voltage capability is reduced. A second controllable switch controlled by an ON signal is arranged between the first resistor R6 and the second resistor R8. Thus, the first comparator U1B only runs in the ON operation to avoid malfunctioning under the other circumstances and improve the controlling reliability.

In the ON operation (ON/OFF signal is HIGH), when the output voltage of the power source is higher than VSET1 after the voltage is divided by the resistors, the first comparator U1B outputs the high level to conduct the first controllable switch Q11, at this moment, the LED start to work. The benefit is that abnormally conducting the LED at the lower voltage can be shielded. In OFF operation, when the voltage between the first resistor R6 and the second resistor R8 is lower than VSET1, the OP outputs a negative voltage, which is capable of directly reducing a driving voltage of the first controllable switch Q11, but before that, Q11 is conducting. At this moment, the electrical charges of the output capacitor CP1 can be consumed by the LED and the first controllable switch Q11.

The LED backlight driver circuit further comprises a second comparator U1C as well as a third resistor R9 and a fourth resistor R7 which are in parallel connection with the second resistor R8. The cathode of the second comparator U1C is connected to a second reference voltage VSET2 and the anode of the second comparator U1C is connected between the first resistor R6 and the third resistor R9; a third controllable switch Q14 controlled by the ON signal is arranged between the first resistor R6 and the third resistor R9 to prevent the malfunction of the second comparator U1C; and the output terminal of the second comparator U1C is coupled with the control end of the first controllable switch Q11. The second reference voltage VSET2 of the second comparator U1C is higher than the first reference voltage VSET1 of the first comparator U1B. When the power source end has the excessive output voltage and its voltage drop at the anode of the second comparator U1C is higher than the second reference voltage VSET2, the second comparator U1C outputs the low level to forcibly switch off the first controllable switch Q11 and protect the LED from being broken down by a high voltage.

The control end of the first controllable switch Q11 is further connected with a dimming control module (IC), the dimming control module outputs a PWM signal to control the first controllable switch Q11 and to regulate the brightness of the LED lightbar by adjusting the duty cycle of the PWM signal. The dimming control module is provided with an overvoltage protection collection point OVP, and the overvoltage protection collection point OVP is connected between the first resistor R6 and the fourth resistor R7. This is one of specific embodiments of the overvoltage protection. It can be matched with the second comparator to play a dual role of protection.

The MOS tube and the like can be used by the first controllable switch Q11, the second controllable switch Q13 and the third controllable switch Q14.

A driving method of the LED backlight drive circuit mentioned above comprises the following steps:

A: Setting the first reference voltage and the second reference voltage which is higher than the first reference voltage; collecting the input voltage at the power source end of the LED backlight drive circuit as the comparison voltage; if the comparison voltage is lower than the first reference voltage, carry out step B; if the comparison voltage is higher than the first reference voltage, carry out step C; if the comparison voltage is lower than the second reference voltage, carry out step D; and if the comparison voltage is higher than the second reference voltage, carry out step E;

B: Driving the first controllable switch to be blocked, and returning to step A;

C: Driving the first controllable switch to be conducted, and returning to step A;

C: Keeping the first controllable switch in the conducting state, and returning to step A;

E: Driving the first controllable switch to be blocked, and returning to step A;

The invention uses the first comparator U1B to control the conducting and the blocking of the LED lightbar. When the voltage drop of the output voltage of the power source, at the anode of the first comparator U1B, is lower than the first reference voltage VSET1, the first comparator U1B outputs the low level, and the first controllable switch Q11 is blocked; only when the voltage drop of the output voltage of the power source, at the anode of the first comparator U1B, exceeds the first reference voltage VSET1, the first comparator U1B outputs the high level, and the first controllable switch Q11 is conducted to ensure that the LED can be conducted at the predetermined voltage for providing the normal brightness. Otherwise, when the LED is conducted at the low voltage, the eyes can feel that the LED is dimming up, causing the displaying quality to be reduced. In the invention, the LED lightbar only can be conducted at the predetermined voltage. Thus, the LED will be unable to be lighted even if the electric quantity is stored in the output capacitor; only when the output voltage achieves the predetermined voltage in the complete ON operation, the first controllable switch Q11 is able to be conducted, which solves the problem of blinking of the LED in the ON operation.

The invention is described in detail in accordance with the above contents with the specific preferred examples. However, this invention is not limited to the specific examples. For the ordinary technical personnel of the technical field of the invention, on the premise of keeping the conception of the invention, the technical personnel can also make simple deductions or replacements, and all of which should be considered to belong to the protection scope of the invention.

We claim:

1. An LED backlight drive circuit, comprising: a power source; wherein an output capacitor and an LED lightbar which is connected in series with a first controllable switch are in parallel connection, and then are arranged between the output terminal and the ground terminal of said power source; said LED backlight drive circuit further comprises a first comparator; a cathode of said first comparator is directly connected to a first reference voltage, a anode of said first comparator is coupled with the output terminal of said power source, and the output terminal of said first comparator is coupled with a control end of said first controllable switch; when the anode voltage of said first comparator exceeds the cathode voltage, the output terminal of said first comparator drives said first controllable switch to be conducted, wherein said LED backlight drive circuit further comprises a second comparator; the anode of said second comparator is connected to a second reference voltage different from the first reference voltage, the cathode of said second comparator is coupled with the output terminal of said power source, and the output terminal of said second comparator is coupled with the control end of said first controllable switch; said second reference voltage is higher than said first reference voltage; when the cathode voltage of said first comparator exceeds the anode voltage, the output terminal of said first comparator drives said first controllable switch to be blocked.

2. The LED backlight drive circuit of claim 1, wherein a first resistor and a second resistor are connected in series between the output terminal and the ground terminal of said power source; the anode of said first comparator is connected between the first resistor and the second resistor.

3. The LED backlight drive circuit of claim 2, wherein a second controllable switch controlled by an ON signal is arranged between said first resistor and said second resistor.

4. The LED backlight drive circuit of claim 1, wherein the first resistor and a third resistor are connected in series between the output terminal and the ground terminal of said power source; the anode of said second comparator is connected between the first resistor and the third resistor; and a third controllable switch controlled by a ON signal is arranged between said first resistor and said third resistor.

5. The LED backlight drive circuit of claim 1, wherein the control end of said first controllable switch is further connected with a dimming control module; said dimming control module is provided with an overvoltage protection collection point; the first resistor and a fourth resistor are connected in series between the output terminal and the ground terminal of said power source; and said overvoltage protection collection point is connected between the first resistor and the fourth resistor.

6. An LCD device, comprising: an LED backlight drive circuit; said LED backlight drive circuit comprises a power source; an output capacitor and an LED lightbar which is connected in series with a first controllable switch are in parallel connection, and then are arranged between the output terminal and the ground terminal of said power source; said LED backlight drive circuit further comprises a first comparator; a cathode of said first comparator is directly connected to a first reference voltage, an anode of said first comparator is coupled with the output terminal of said power source, and the output terminal of said first comparator is coupled with a control end of said first controllable switch; when the anode voltage of said first comparator exceeds the cathode voltage, the output terminal of said first comparator drives said first controllable switch to be conducted, wherein said LED backlight drive circuit further comprises a second comparator; the anode of said second comparator is connected to a second reference voltage different from the first reference voltage, the cathode of said second comparator is coupled with the output terminal of said power source, and the output terminal of said second comparator is coupled with the control end of said first controllable switch; said second reference voltage is higher than said first reference voltage, when the cathode voltage of said first comparator exceeds the anode voltage, the output terminal of said first comparator drives said first controllable switch to be blocked.

7. The LCD device of claim 6, wherein a first resistor and a second resistor are connected in series between the output terminal and the ground terminal of said power source; and the anode of said first comparator is connected between the first resistor and the second resistor.

8. The LCD device of claim 7, wherein a second controllable switch controlled by an ON signal is arranged between said first resistor and said second resistor.

9. The LCD device of claim 6, wherein the first resistor and a third resistor are connected in series between the output terminal and the ground terminal of said power source; the anode of said second comparator is connected between the first resistor and the third resistor; and a third controllable switch controlled by an ON signal is arranged between said first resistor and said third resistor.

10. The LCD device of claim 6, wherein the control end of said first controllable switch is further connected with a dimming control module, said dimming control module is provided with an overvoltage protection collection point, the first resistor and a fourth resistor are connected in series between the output terminal and the ground terminal of said power source, and said overvoltage protection collection point is connected between the first resistor and the fourth resistor.

* * * * *